(12) United States Patent
Sakagami et al.

(10) Patent No.: US 6,249,072 B1
(45) Date of Patent: Jun. 19, 2001

(54) MOTOR LAMINATED CORE, METHOD OF MANUFACTURING SAME, MOTOR AND INK JET RECORDING DEVICE

(75) Inventors: Eimatsu Sakagami, Suwa; Kazushige Umetsu, Chino, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/331,043

(22) PCT Filed: Oct. 16, 1998

(86) PCT No.: PCT/JP98/04683

§ 371 Date: Jun. 16, 1999

§ 102(e) Date: Jun. 16, 1999

(87) PCT Pub. No.: WO99/21264

PCT Pub. Date: Apr. 29, 1999

(30) Foreign Application Priority Data

| Oct. 17, 1997 | (JP) | .................................................... 9-285907 |
| Mar. 9, 1998 | (JP) | ................................................. 10-057198 |
| Sep. 16, 1998 | (JP) | ................................................. 10-262127 |

(51) Int. Cl.⁷ ............................... H02K 1/06; H02K 1/12

(52) U.S. Cl. .......................................... 310/217; 310/259

(58) Field of Search .................................. 310/216, 217, 310/218, 254, 258, 259, 51; 219/121.6, 121.63

(56) References Cited

U.S. PATENT DOCUMENTS

| 4,509,872 | * | 4/1985 | Shimogawara | 400/144.1 |
| 4,754,178 | * | 6/1988 | Kavanaugh | 310/49 R |
| 4,990,809 | * | 2/1991 | Artus et al. | 310/192 |
| 5,053,601 | | 10/1991 | Landtwing et al. | 219/121.63 |
| 5,942,831 | * | 8/1999 | Yamada et al. | 310/217 |

FOREIGN PATENT DOCUMENTS

| 677635 | 6/1991 | (CH) . |
| 1145544 | 3/1997 | (CN) . |
| 0343661 | 5/1989 | (EP) . |
| 0748025 | 12/1996 | (EP) . |

(List continued on next page.)

OTHER PUBLICATIONS

Partial English Translation of JP 115845 dated Aug. 8, 1983.
Patent Abstracts of Japan of JP 9856099 dated Feb. 25, 1997.
Patent Abstracts of Japan of JP 77876 dated Jan. 10, 1995.
Patent Abstract of Japan of JP 2220790 dated Sep. 3, 1990.
English Abstract of WO90/09863 dated Sep. 7, 1990.
Patent Abstract of Japan of JP 9168258 dated Jun. 24, 1997.
Patent Abstracts of Japan of 5666023 dated Jun. 4, 1981.

*Primary Examiner*—Nestor Ramirez
*Assistant Examiner*—Dang Dinh Le
(74) *Attorney, Agent, or Firm*—Ladas & Parry

(57) ABSTRACT

A laminated core of a motor in which vibrations of core plates causing motor noise is restrained at a low cost; a method of manufacturing such a laminated core; a motor having such a laminated core; and an ink-jet recording apparatus having such a motor. In a laminated core (1) of a motor in which a plurality of core pieces (10) are laminated on each other and which has magnetic poles (13) each having a roughed surface of mountain portions (13*a*) and groove portions (13*b*) formed alternately in the direction of rotation of the motor, welded portions (31) for firmly fixing the core pieces (10) to each other are provided in the surface of one of the groove portions (13*b*) formed in the vicinities of the central portion of each magnetic pole (13) in the direction of rotation. Each welded portion (31) is formed continuously in the direction of lamination of the core pieces (10). Each welded portion (31) is formed by welding the surface of the groove portion (13*b*). By these welded portions (31), the core pieces (10) are firmly fixed to each other in the surface portions of the magnetic pole portions (13).

18 Claims, 11 Drawing Sheets

FOREIGN PATENT DOCUMENTS

| | | |
|---|---|---|
| 5666023 | 6/1981 | (JP). |
| 115845 | 8/1983 | (JP). |
| 252127 | 2/1990 | (JP). |
| 2220790 | 9/1990 | (JP). |
| 77876 | 1/1995 | (JP). |
| 956099 | 2/1997 | (JP). |
| 9168258 | 6/1997 | (JP). |
| 9009863 | 9/1990 | (WO). |

* cited by examiner

MOTOR LAMINATED CORE, METHOD OF MANUFACTURING SAME, MOTOR AND INK JET RECORDING DEVICE

TECHNICAL FIELD

The present invention relates to a laminated motor core, a method of manufacturing such a laminated core, a motor incorporated with such a laminated core, and an ink-jet recording apparatus provided with such a motor, and particularly relates to restraint of vibrations of a laminated core used in a stepping motor, a servo motor, or the like.

BACKGROUND ART

Conventionally, a laminated core to be used as a stator core of a stepping motor or the like is formed in such a structure that a plurality of core pieces 10 of magnetic material are laminated, similarly to that which is shown in FIGS. 1 and 2. Each core piece 10 is formed with such a flat shape as illustrated, by progressive forming by a press, in advance. Thereafter, one core piece 10 is put on the top of another core piece 10, and half blanking is performed in caulking portions 14 as illustrated so that the two core pieces 10 are fitted and fixed to each other. Such a process is repeated to fix a large number of core pieces 10 to each other sequentially to thereby form a laminated core 1.

The laminated core 1 is provided with an outer frame portion 11 formed in the outer circumferential portion, and teeth portions 18 formed in the inner circumferential portion. The teeth portions 18 are constituted by, for example, eight bridge portions 12 projecting inward from the inner circumferential surface of the outer frame portion 11, and magnetic pole portions 13 formed on the forward ends of these bridge portions 12, respectively. A surface-roughed shape constituted by mountain portions 13a and groove portions 13b formed alternately in the direction of rotation of a not-shown rotor is formed in the inner circumferential edge portion of each of the magnetic pole portions 13. The area surrounded by these eight magnetic pole portions 13 forms an inner hole 16 which is substantially circular, so that a not-shown rotor is received in this inner hole 16.

However, in a motor in which such a laminated core as mentioned above is used as a stator core, large noise may be caused when the motor is driven. Though this noise is considered to be caused for various reasons, the present inventors have found, through various analyses, that the main reason is in that the core pieces 10 of the stator core vibrate in the vicinities of the magnetic pole portions 13, and the core pieces 10 resonate in the case where a certain condition is satisfied.

In order to restrain such vibrations or resonance, it is considered necessary to fix the core pieces 10 to each other at a portion each of the teeth portions 18.

Therefore, caulking portions 15 was provided in the bridge portions 12 of the respective teeth portions by way of experiment. As a result, it was found that the above-mentioned vibrations or resonance could be reduced effectively. However, in this case, the number of the caulking portions 15 increased correspondingly to the number of the teeth portions 18, so that not only it was necessary to make mold adjustment which requires high technique and skill, but also the durability of the mold was required unreasonably. Accordingly, the manufacturing cost was increased.

Further, caulking portions were provided in the magnetic pole portions 13 of the teeth portions 18 by way of experiment. In this case, not only it was difficult to perform half blanking but also it was difficult to ensure the strength of the mold because the plane shapes of the respective core pieces 10 are formed to be narrow in the magnetic pole portions 13. Accordingly, manufacturing was difficult in practical use.

Furthermore, another method in which the core pieces 10 are bonded with each other by a bonding agent or tape with a bonding agent may be considered. However, not only it is comparatively difficult to automate this bonding process and it requires high cost to provide equipment therefor, but also there is such a danger that the bonding agent is eluted in the process of cleansing the stator core to make the core pieces 10 separate from each other.

DISCLOSURE OF THE INVENTION

It is an object of the present invention to provide a laminated motor core in which vibrations of core pieces causing motor noise can be restrained at a low cost, and a method of manufacturing such a laminated core.

It is another object of the present invention to provide a motor and an ink-jet recording apparatus, in which noise is prevented from being made.

(1) According to an aspect of the present invention, provided is a laminated core of a motor in which a plurality of magnetic plates are laminated one on another, the laminated core being provided with magnetic poles each having a roughed surface constituted by mountain portions and groove portions formed alternately in the direction of rotation of the motor, characterized in that welded portions for firmly fixing the magnetic plates to each other are provided in surfaces of the groove portions formed in the magnetic poles. According to this invention, the welded portions for firmly fixing the magnetic plates to each other are provided in the surfaces of the groove portions of the magnetic poles, so that it is possible to firmly fix the magnetic plates to each other in the magnetic poles to which a magnetic force is applied. Accordingly, it is possible to restrain the generation of vibrations, so that it is possible to reduce motor noise. In addition, the welded portions are formed in the groove portions where the magnetic flux density is small, so that it is possible to restrain deterioration of the magnetic characteristic caused by heat at the time of welding.

(2) According to another aspect of the present invention, in the laminated core of a motor described above in the item (1), the welded portion is provided in the surface of the groove portion formed in the vicinities of the central portion of each of the magnetic poles in the direction of rotation. As is understood from magnetic flux density distribution and magnetic flux distribution in FIGS. 4 and 5 which will be described later, the magnetic flux density becomes lowest, for example, to be in a range of from 2,500 to 5,000 gausses in the groove portions near the central portions of the magnetic poles. Since the welded portions are formed in such positions (near the central portions of the magnetic pole portions in the direction of rotation), it is possible to further reduce the deterioration of the magnetic characteristic, and it is also possible to obtain symmetry of a fixation force in the magnetic pole portions to thereby make it possible to restrain the generation of vibrations efficiently.

(3) According to a further aspect of the present invention, in the laminated core of a motor described in the above item (1), the welded portions are provided in the surfaces of the groove portions respectively formed on opposite end sides of each of the magnetic poles in the direction of rotation. On the opposite end dies of each magnetic pole, vibrations with large amplitude are apt to be produced because the opposite end sides are in the most distant positions from the base of the bridge portion. Since the welded portions are provided in such portions, it is possible to restrain vibrations effectively.

(4) According to another aspect of the present invention, provided is a laminated core of a motor in which a plurality of magnetic plates are laminated one on another, the laminated core being provided with magnetic poles each having a roughed surface constituted by mountain portions and groove portions formed alternately in the direction of rotation of the motor, characterized in that welded portions for firmly fixing the magnetic plates to each other are provided on both back-surface-side shoulder portions of each of the magnetic poles. The magnetic flux density is a comparatively small in the back-surface-side shoulder portions of the magnetic poles. Accordingly, deterioration of the magnetic characteristics caused by heat at the time of welding is too small to give a bad influence to the characteristics of the motor.

(5) According to a further aspect of the present invention, provided is a laminated core of a motor in which a plurality of magnetic plates are laminated one on another, the laminated core being provided with magnetic poles each having a roughed surface constituted by mountain portions and groove portions formed alternately in the direction of rotation of the motor, characterized in that welded portions for firmly fixing the magnetic plates to each other are provided on both side surfaces of each of bridge portions connecting the magnetic poles with an outer frame. Though the magnetic flux density is comparative large in the both sides of each of the bridge portions, the bridge portion is comparatively wide (in comparison with the mountain portions of the magnetic poles). Therefore, it gives no bad influence to the characteristic of the motor even if there is some deterioration of the magnetic characteristic caused by heat at the time of welding.

(6) According to a still further aspect of the present invention, in the laminated core of a motor described in any one of the above items (1) to (5), each of the welded portions is extended in the direction of lamination of the magnetic plates and formed integrally. Since the welded portions are formed integrally so as to extend in the direction of lamination of the magnetic plates, it is not necessary to position and weld the welded portions in bonded portions of the thin magnetic plates so that it is possible to form the welded portions rapidly and inexpensively.

(7) According to another aspect of the present invention, in the laminated core of a motor described in the above item (6), each of the welded portions is formed so that a plurality of welded spots are disposed to overlap each other in the direction of lamination. Since the welding process can be performed discontinuously in the direction of lamination, light radiation can be performed discontinuously, so that it is possible to reduce the output and load of the apparatus while it is possible to give high welding energy to the welded portions. In addition, since the welded spots are overlapped each other, it is possible to prevent a failure in the welding process caused by discontinuous formation of the welded portions.

(8) According to a further aspect of the present invention, in the laminated core of a motor described in any one of the above items (1) to (7), the welded portions are formed by welding by laser radiation. Places to be welded can be welded at a high accuracy and at a high speed by laser radiation even if the places are comparatively small areas and exist in deep portions such as grooves of a stator core.

(9) According to a still further aspect of the present invention, provided is a method of manufacturing a laminated core of a motor in which a plurality of magnetic plates are laminated one on another, the laminated core being provided with magnetic poles each having a roughed surface constituted by mountain portions and groove portions formed alternately in the direction of rotation of the motor, characterized in that a welding process for firmly fixing the magnetic plates to each other is given to surfaces of the groove portions formed in the magnetic poles. As the conditions used here for the welding process, the respective magnetic plates have to be welded sufficiently, and deterioration of the magnetic characteristic caused by heat at the time of welding should be avoided. However, as a result of experiments, it was found that a satisfactory result could be obtained easily even if no special conditions were taken so long as conditions within a scope which were ordinarily selected by those skilled in the art as welding conditions were taken. This welding process is, for example, applied onto the surfaces of the groove portions formed in the vicinities of central portions or in the opposite end of the respective magnetic poles in the direction of rotation. Furthermore, the welding process may be applied onto places other than the groove portions of the magnetic poles, for example, two back-surface-side shoulder portions of each of the magnetic poles, or both side surfaces of the bridge portion connecting each magnetic pole with the outer frame portion.

(10) According to another aspect of the present invention, in the method of manufacturing a laminated core described in the above item (9), the welding process is continuously given in the direction of lamination of the magnetic plates. By giving the welding process continuously in the direction of lamination, it is possible to perform the welding process rapidly and without much labor.

(11) According to a further aspect of the present invention, in the method of manufacturing a laminated core of a motor described in the above item (9) or (10), the welding process is performed by scanning with light spots in the direction of lamination of the magnetic plates so that the magnetic substances idper se are melted by the heat of the light spots to thereby perform the welding process. Of course the welding process can be performed by using bonding material attached to the surfaces of the groove portions. But, even by welding the surfaces per se of the groove portions, it is possible to obtain a sufficient fixation force while avoiding the influence on the magnetic characteristic.

(12) According to a still further aspect of the present invention, in the method of manufacturing a laminated core of a motor described in the above item (11), scanning with the light spots is performed discontinuously at such an interval that spot areas are overlapped each other in the direction of lamination. Since the welding process can be performed discontinuously in the direction of lamination, it is possible to perform light radiation discontinuously. Accordingly, it is possible to reduce the output and load of the apparatus while it is made possible to give high welding energy to the welded portions. In addition, since the welded spots are overlapped each other, it is possible to prevent a failure of the welding process caused by discontinuous formation of the welded portions.

(13) According to another aspect of the present invention, in the method of manufacturing a laminated core of a motor described in the above item (11) or (12), the light spots and the laminated core are moved relatively in the direction of the laminated core while keeping a predetermined angle. By relatively moving the light spots and the laminated core in the direction of lamination while keeping the incident angle of light flux, it is possible to keep the light spots in a predetermined shape at the time of scanning. Accordingly, it is possible to perform heating stably with a stable energy density within a stable irradiation region, so that it is possible to reduce a welding failure of the magnetic plates and it is possible to perform heating at a minimum because of the enhancement of stability. Accordingly, it is possible to restrain deterioration of the magnetic characteristic of the magnetic poles due to heating.

(14) According to a further aspect of the present invention, in the method of manufacturing a laminated core of a motor described in any one of the above items (9) to (13), the welding process is performed by laser radiation. Places to be welded can be welded at a high accuracy and at a high speed by laser radiation even if the places are comparatively small areas and exist in deep portions such as grooves of a stator core. This method is particularly suitable for welding such a laminated core. It has been found that this welding by laser radiation is preferably performed under conditions that the radiation power of laser light is limited to some extent.

(15) According to a still further aspect of the present invention, provided is a motor in which a laminated core of a motor described in any one of the above items (1) to (8) is incorporated as a stator core. It is therefore possible to obtain a motor in which noise is restrained.

(16) According to another aspect of the present invention, provided is an inkjet recording apparatus in which a motor described in the above item (15) is mounted as a driving source of a paper feeding mechanism or an ink-jet head feeding mechanism. It is therefore possible to obtain an ink-jet recording apparatus in which noise is in a low level during printing.

THE BEST MODE FOR CARRYING-OUT THE INVENTION

Embodiment 1

Figure 1:
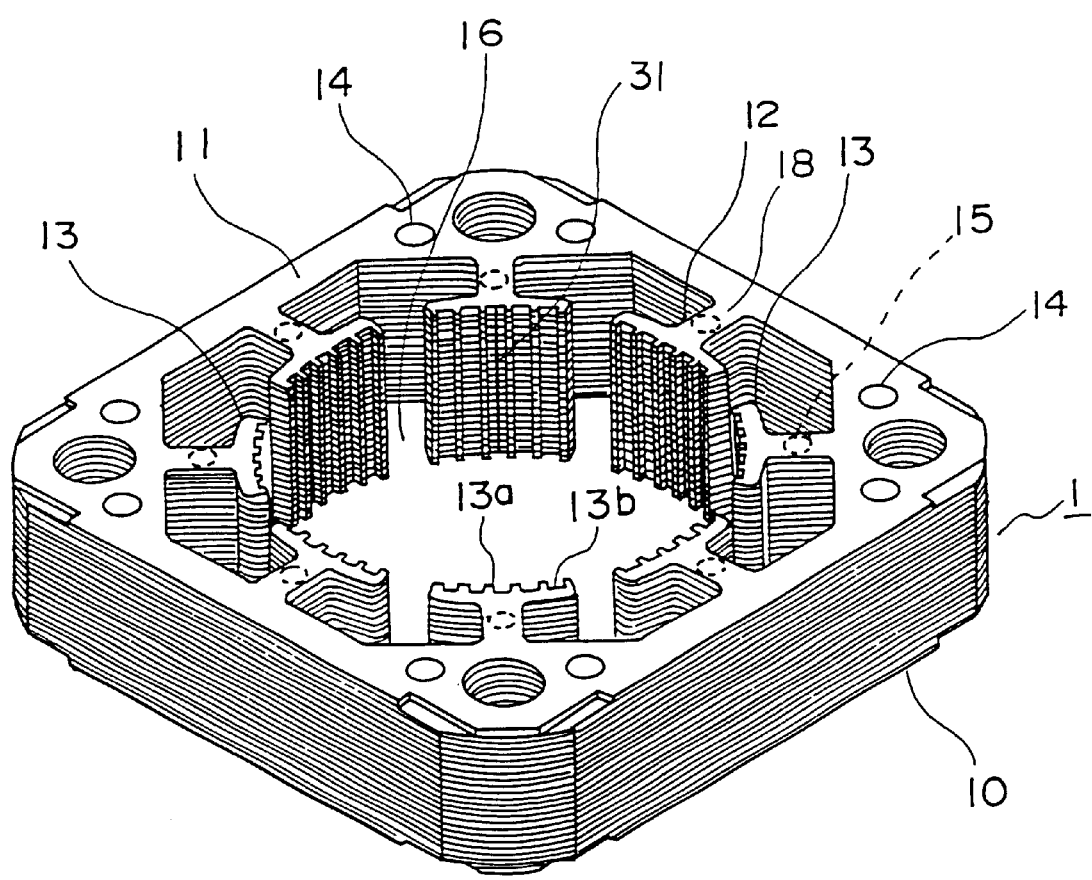
FIG. 1 is a perspective view illustrating a whole structure of a laminated motor core according to Embodiment 1 of the present invention.
Figure 2:
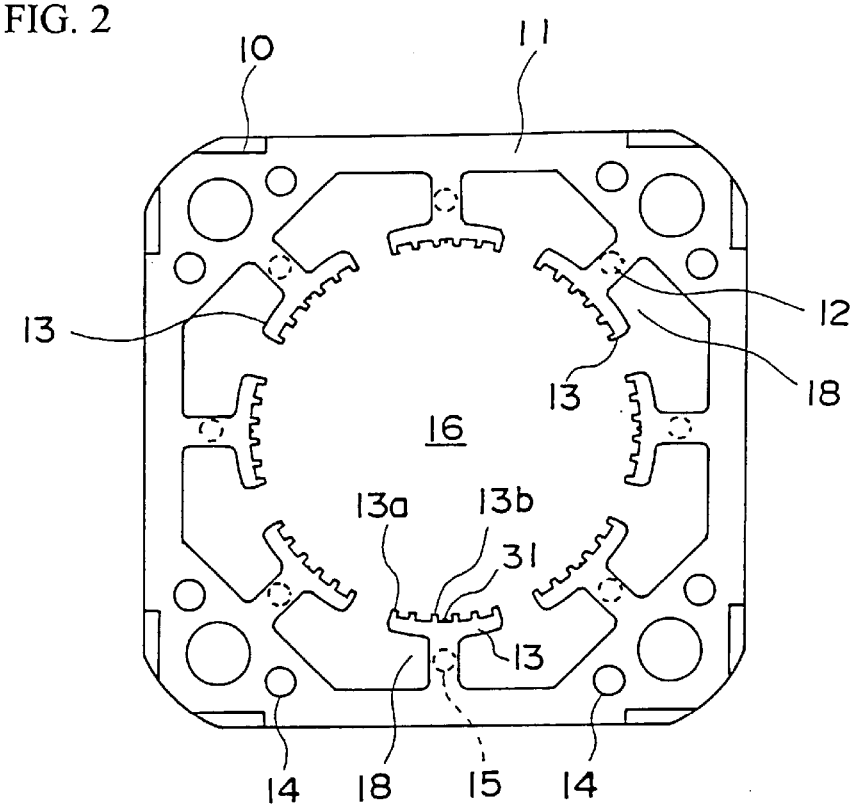
FIG. 2 is a plan view of the laminated motor core in FIG. 1.
Figure 3:
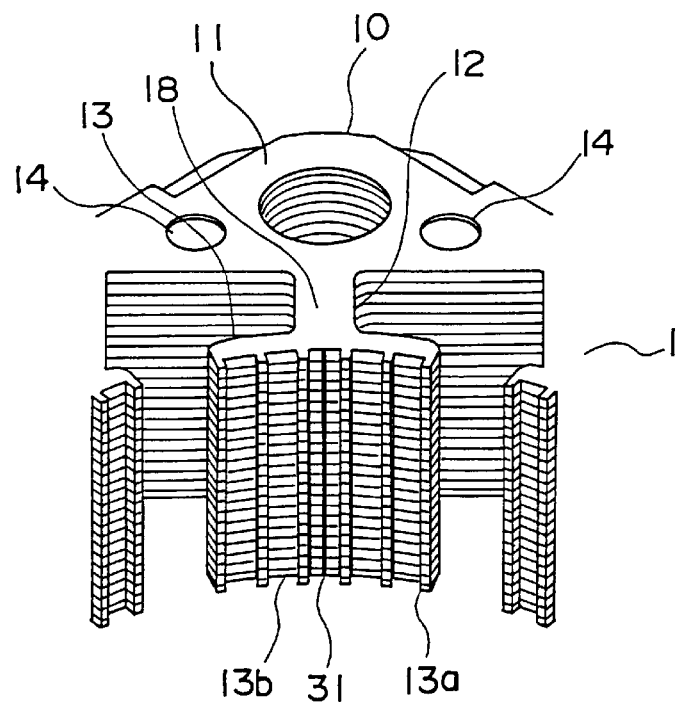
FIG. 3 is an enlarged perspective view illustrating, in enlargement, the surface of a magnetic pole portion of the laminated motor core of FIG. 1.

The basic structure of a laminated core according to Embodiment 1 of the present invention is that which has been described in the above section of "Background of the Invention". In a laminated core 1 in Embodiment 1, of a plurality of mountain portions 13*a* and groove portions 13*b* formed on the surface of each of eight magnetic pole portions 13 facing an inner hole 16 of the laminated core 1, a welded portion 31 is formed in the surface of a groove portion 13*b* at the center of the magnetic pole portion 13 viewed in the direction of rotation of a not-shown rotor received into the inner hole 16, as shown in FIGS. 1 to 3. Of course, a laminated core of the present invention is not limited to that which has eight magnetic pole portions 13, but includes that which has any number of magnetic pole portions other than eight. Although caulking portions 15 are illustrated in FIGS. 1 and 2, they are merely for explaining the background of the present invention, and they are therefore eliminated in the laminated core of the present invention.

Each of the welded portions 31 formed in the groove portions 13*b* is extended in the direction of lamination of the laminated core 1 and formed in a single-integral line. The welded portions 31 are formed by welding the surface of the groove portion 13*b* as will be described later. By those welded portions 31, core pieces 10 are firmly fixed to each other in the surface portions of the magnetic pole portions 13.

Other than by welding the surface per se of the groove portions 13*b*, the welded portions 31 may be formed, for example, by using solder in such a manner that solder is deposited on the surface of the groove portions 13*b* so as to extend in the direction of lamination, and thereafter heated so as to be fused. Metal, synthetic resin or the like other than solder may be used if it can fix the core pieces 10 to each other. Such a deposited material may be heated and melted by light radiation as will be described later; by an electrical heating method such as resistance heating, induction heating, etc; or by a physical heating method such as bringing a heater, a heating iron or the like into contact with the surface of the groove portions 13*b*. The physical heating method can be employed not only for heating and melting the deposited material but also for heating and melting the surface per se of the groove portions 13*b*.

Figure 4:
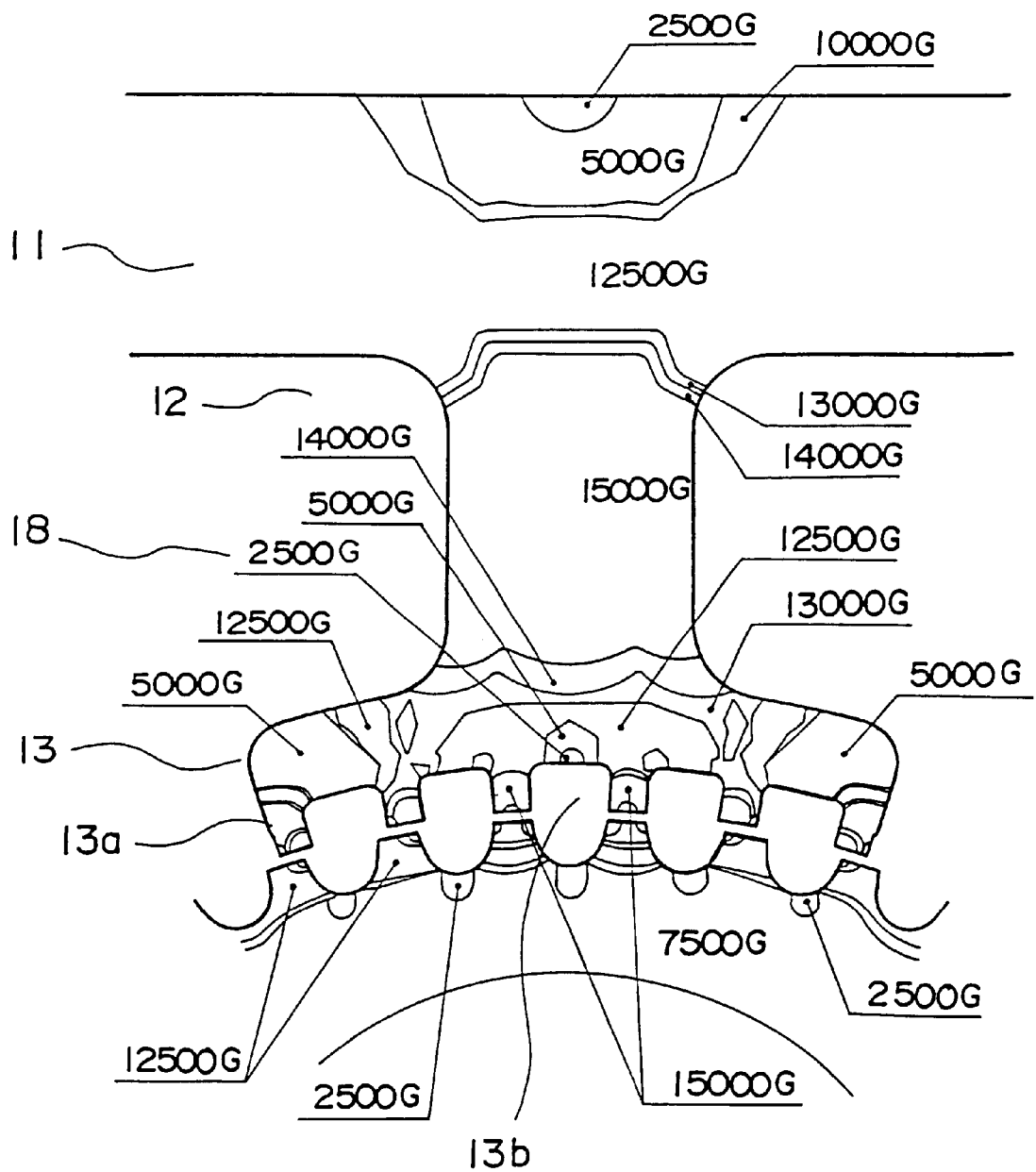
FIG. 4 is a two-dimensional simulation diagram of magnetic flux density distribution of a teeth portion in a motor including the laminated core as a stator core in the excited condition of the motor.
Figure 5:
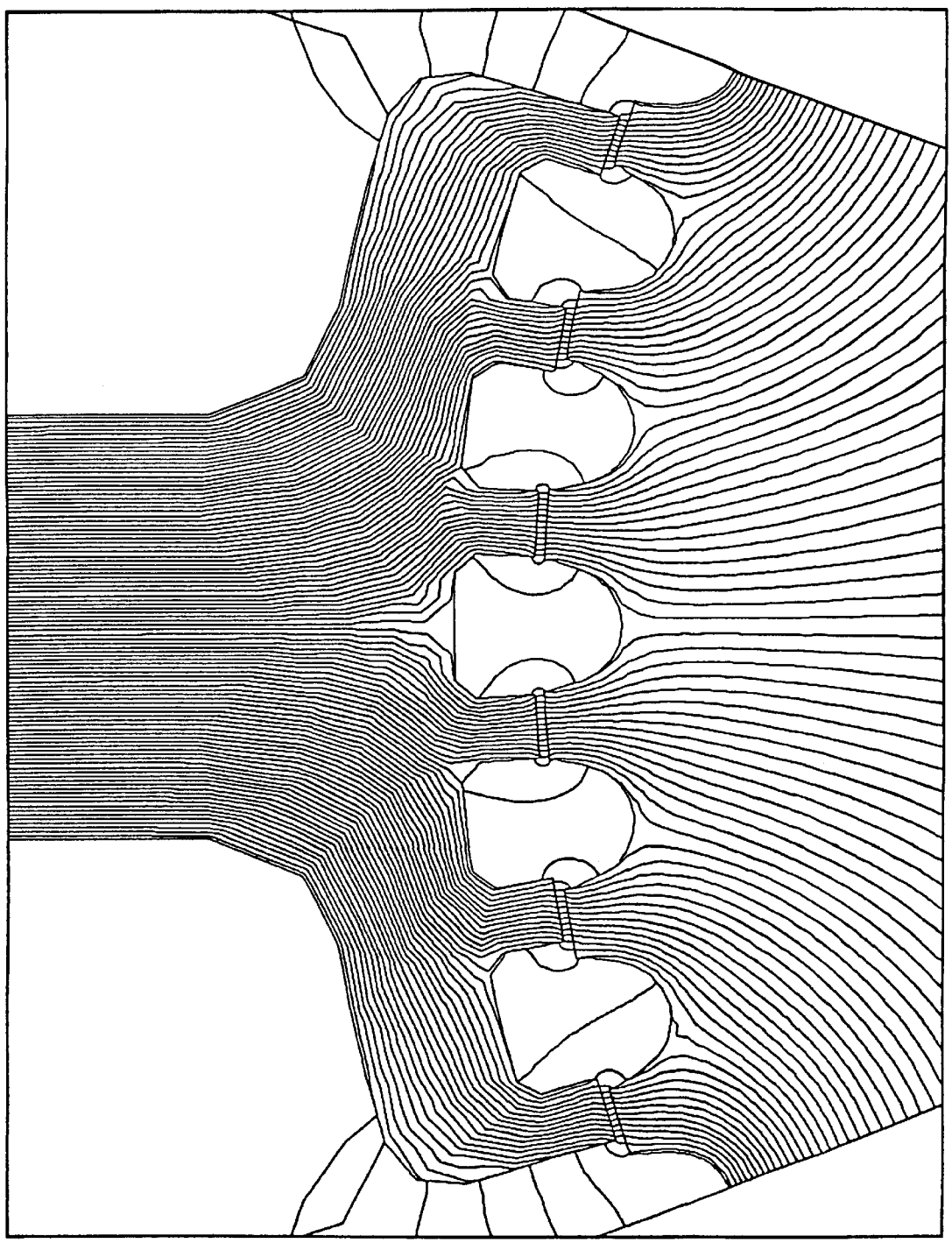
FIG. 5 is a two-dimensional simulation diagram of the magnetic flux density distribution in FIG. 4

The magnetic flux density distribution and the magnetic flux distribution in each of the teeth portions 18 in a condition of excitation are as shown in FIGS. 4 and 5. As is also understood from these drawings, the magnetic flux density becomes lowest to be in a range of from 2,500 to 5,000 gausses in the groove portion 13*b* of the magnetic pole portion 13 of each of the teeth portions 18, particularly in the groove portion 13*b* near the central portion. As a result, it is understood that even if the magnetic characteristic deteriorates due to heat at the time of welding, the deterioration in that portion is particularly small. In addition, the mountain portions 13*a* of the magnetic pole portion 13 and the corner portions thereof have the highest magnetic flux density. It is understood that the influence given to the magnetic characteristic by heat at the time of welding is largest in that portions. Although the magnetic flux density is expressed with contour lines for the sake of convenience in FIG. 4, the magnetic flux density changes not stepwise but smoothly.

Accordingly, in Embodiment 1, since the welded portion 31 is disposed on the surface of the groove portion 13b where the magnetic flux density is relatively small, the core pieces 10 can be firmly fixed to each other sufficiently without giving any influence to the magnetic characteristic of the laminated core 1 as possible. Further, of the groove portions 13, the welded portion 31 is formed in one groove portion near the central portion of the magnetic pole portion 13 so that it is possible to ensure the symmetry of the fixation force between the core pieces 10, while the portions which may receive magnetic stress easily are firmly fixed so that it is possible to obtain an effect to restrain vibrations efficiently and effectively.

Further, in Embodiment 1, it is possible to carry out the process of forming the welded portion 31 comparatively inexpensively. In the method in which the caulking portions 15 are provided as mentioned above, it is necessary to change a mold or a process for providing a new caulking portions. Besides, the bridge portions 12 where the caulking portions 15 are provided become so narrow that the magnetic performance deteriorates. Further, the diameter of each of the caulking portions 15 is so small that the life of a mold per se is shortened and the maintenance cost is increased correspondingly. In Embodiment 1, on the other hand, it will go well if the welding is performed on the eight magnetic pole portions 13 after the laminated core 1 is completed. The contents of the process are simple and easy, and the process can be automated easily and inexpensively. Furthermore, it is possible to obtain a sufficient effect to restrain vibrations because the welded portions 31 are formed on the surfaces of the respective magnetic pole portions 13 facing the rotor.

Further, in Embodiment 1, the welding portion 31 is provided at only one place in each of the magnetic portions 13. It is possible to minimize the influence onto the magnetic characteristic due to degeneration of the core pieces 10 in the magnetic pole portions 13. Although the welded portions 31 may be provided in two or more places in each of the magnetic pole portions 13, it is preferable to dispose the welded portions 31 symmetrically with respect to the central position in the direction of rotation in each of the magnetic pole portions 13 from the point of view of ensuring the symmetry of the fixation force between the core pieces 10 as mentioned above. When the magnetic pole portions are asymmetric in accordance with specifications, it is preferable to dispose the welded portion 31 in the vicinity of the center of each of the magnetic pole portions.

A motor in which the laminated core 1 according to Embodiment 1 was incorporated as a stator core and a conventional motor in which a conventional laminated core was incorporated as a stator core were manufactured respectively, and the noise characteristics of those motors were measured and compared in an anechoic room. As a result, the average noise level was 27 dB in the motor of Embodiment 1 while the average noise level was 34 dB in the conventional motor. It was confirmed that the motor according to Embodiment 1 has an effect to improve noise by 7 dB (noise is reduced by 55%).

Figure 6:
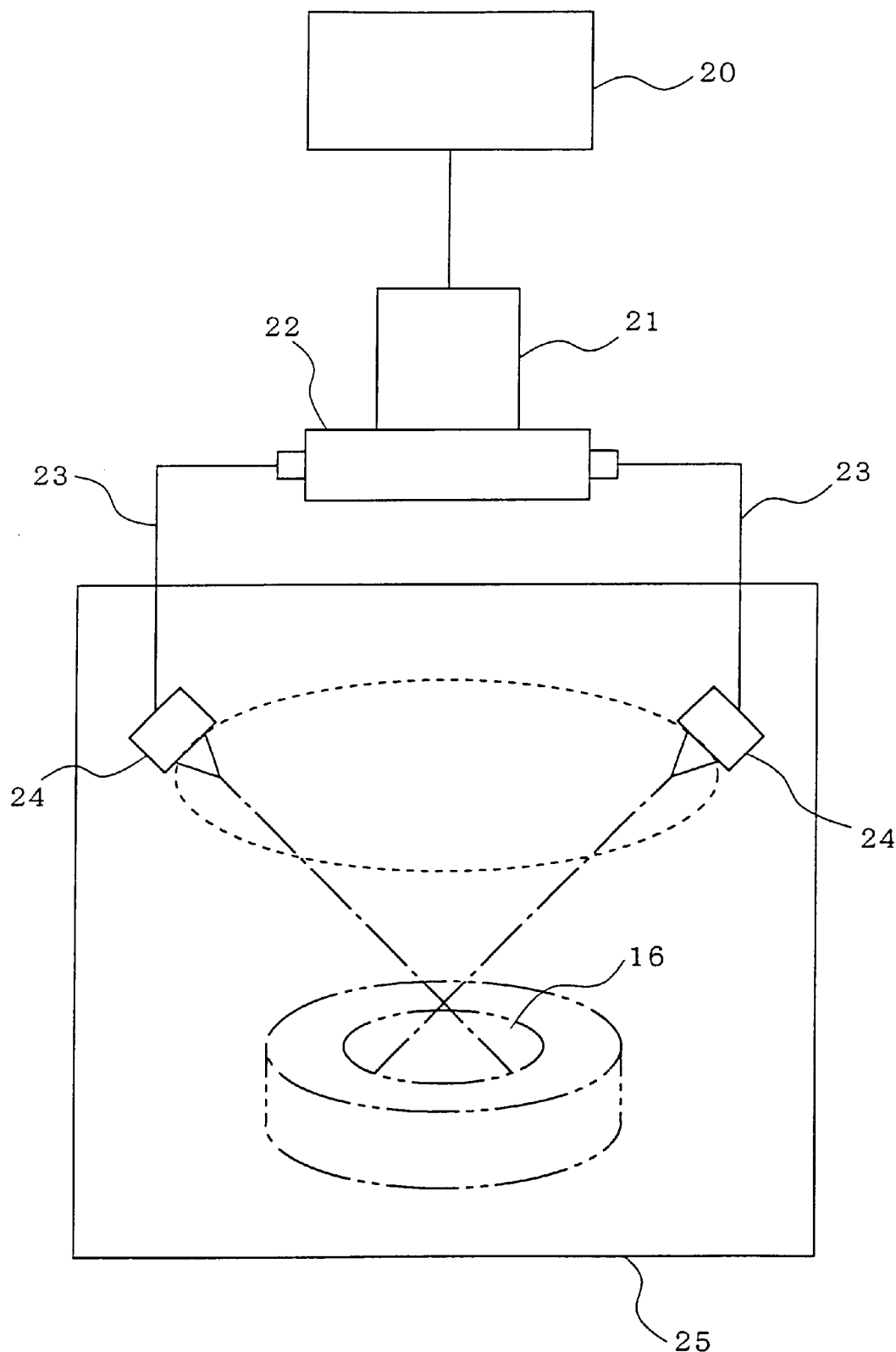
FIG. 6 is a schematic configuration diagram of an apparatus for performing a welding process used for manufacturing the laminated motor core of FIG. 1.

Next, a method of manufacturing the laminated core 1 according to Embodiment 1 will be described with reference to FIGS. 6 and 7. A welding apparatus of FIG. 6 is an apparatus for applying a process of welding to a laminated core in which a plurality of core pieces 10 formed by progressive forming of a press are laminated on each other and fixed to each other by caulking portions 14. A light branching unit 22 is attached to a laser oscillator 21 connected to a laser power source 20 including a cooling unit, and optical fibers 23 are connected to a plurality of output portions of the light branching unit 22. The optical fibers 23 are connected to emission units 24 so that laser beams are emitted from the respective emission units 24. The emission units 24 are disposed so as to radiate laser lights obliquely at an incident angle of about 45 degrees with respect to the direction of lamination (up/down direction in the drawing) of the laminated core 1 from two directions shifted from each other by 180 degrees into the inner hole 16 of the laminated core 1 indicated by two-dot chain line. Not only the two emission units 24 and the laminated core 1 are arranged to be relatively movable in the up/down direction to come close to or to separate from each other by a driving mechanism 25, but also they can be rotated by 45 degrees relatively to each other around the upward/downward axial line of the laminated core 1.

The driving mechanism 25 is constituted by elevation mechanisms 25A for moving the emission units 24 up and down respectively, and a rotary table 25B for mounting and rotating the laminated core 1 thereon. Each elevation mechanism 25A is designed to move the emission unit 24 up and down while keeping the posture of the latter, so that a light spot can be moved up and down along the inner surface of the inner hole 16 of the laminated core. In addition, in order that the above-mentioned two emission units 24 perform welding on two of the eight magnetic pole portions 13, the elevation mechanisms 25A make the light spots scan from the upper opening of the inner hole 16 to the lower opening along the inner surface of the inner hole 16 of the laminated core 1 and thereafter make the rotary table 25B rotate at an angle of 45 degrees so that the light spots are radiated on the next two of the rest magnetic pole portions which have not been processed yet. Such rotation of the rotary table 25B and welding are repeated to process the eight magnetic pole portions 13 sequentially.

The number of the emission units 24 may be only one unit, or three or more. In addition, although the emission units 24 are arranged to move up and down in the above embodiment, the rotary table 25B may be designed to be movable up and down so as to move the laminated core 1. In short, it will go well if the light spots and the laminated core can move in the direction of lamination relatively to each other.

The laser oscillator 21 shown in FIG. 6 may generate light of a predetermined wave length continuously so that the emission units 24 moving up and down may scan the inside of the inner hole 16 of the laminated core 1 continuously with the light spots. Alternatively, discontinuous scanning may be performed with light spots by laser-light pulses generated by the laser oscillator 21. In that case, not only it is possible to reduce the energy consumption of the laser oscillator 21 or the load of the apparatus, but also it is possible to obtain a high light output.

In the case where a light spot is formed discontinuously for scanning, there is a possibility that the light spot cannot radiate between the core pieces 10 in accordance with the scanning speed and the time interval for light spot formation. Though the scanning speed and the time interval for light spot formation can be controlled to make the position of the light spot to be coincident with the contact portion between the core pieces 10, the apparatus configuration becomes complicated and there is a possibility that welding will not be sufficient if the positions of the light spots are shifted up and down slightly.

Figure 8:
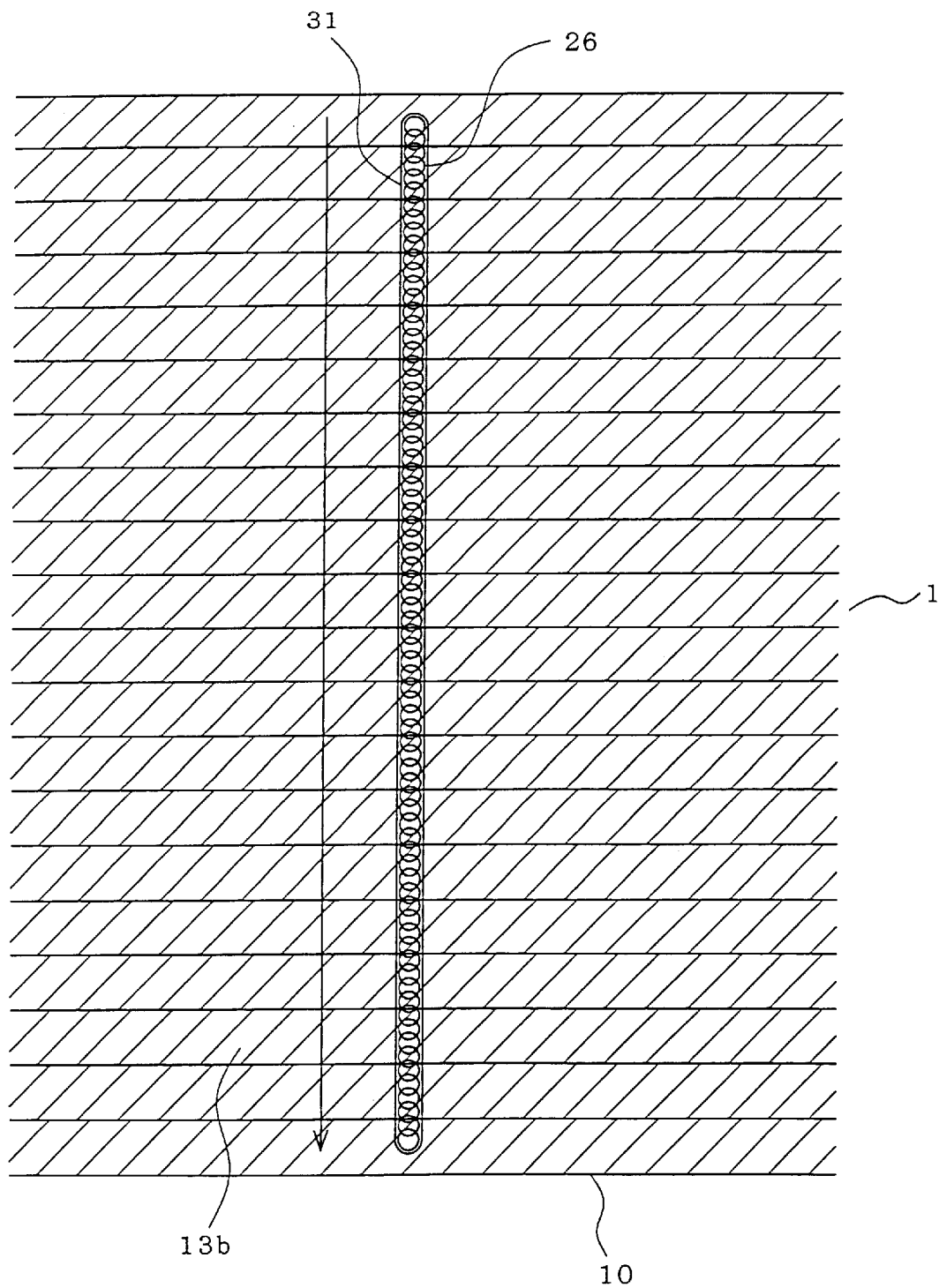
FIG. 8 is an enlarged view illustrating the shape of a light spot and a welded portion in the welding process in FIG. 7.

With respect to this point, in Embodiment 1, the scanning speed, the light spot diameter and the time interval for light spot formation are set in advance so that the light spots 26 are overlapped each other in the direction of lamination when the light spots 26 are scanned on the surface of the groove portion 13b in the direction of lamination, as shown in FIG. 8. Accordingly, even if the light spots 26 are formed on the surface of the groove portion 13b discontinuously, the welded portion 31 is formed continuously and welding failure caused by the displacement of the light spots 26 can be prevented without using any fine control or any fine control device.

In addition, in Embodiment 1, the shape of the light spot 26 is fixed because the incident angle of the laser beam emitted by the emission unit 24 is kept constant. Accordingly, the density and amount of energy given by the laser light are also fixed, so that it is possible to perform welding stably.

Although the shape of the light spot 26 is illustrated as a circle in FIG. 8, it is preferable to radiate the light spot 26 having an ellipsoidal shape with a major axis extending in the scanning direction of the light spot 26, that is, in the up/down direction or in the direction of lamination. In such a manner, because the light spot diameter is enlarged in the direction of lamination along which scanning is performed, it is easy to perform continuous welding with discontinuous light spots while adjacent welded spots are overlapped each other. Further, it is possible to shorten a scanning time or a welding time which is required to overlap the light spots each other in the scanning direction. Then, it is preferable to make the diameter of the light spot 26, that is, the width of the welded portion 31 equal to or less than half of the width of the groove portion 31b in order to avoid the influence on the mountain portions 13a.

Embodiment 2

Figure 9:
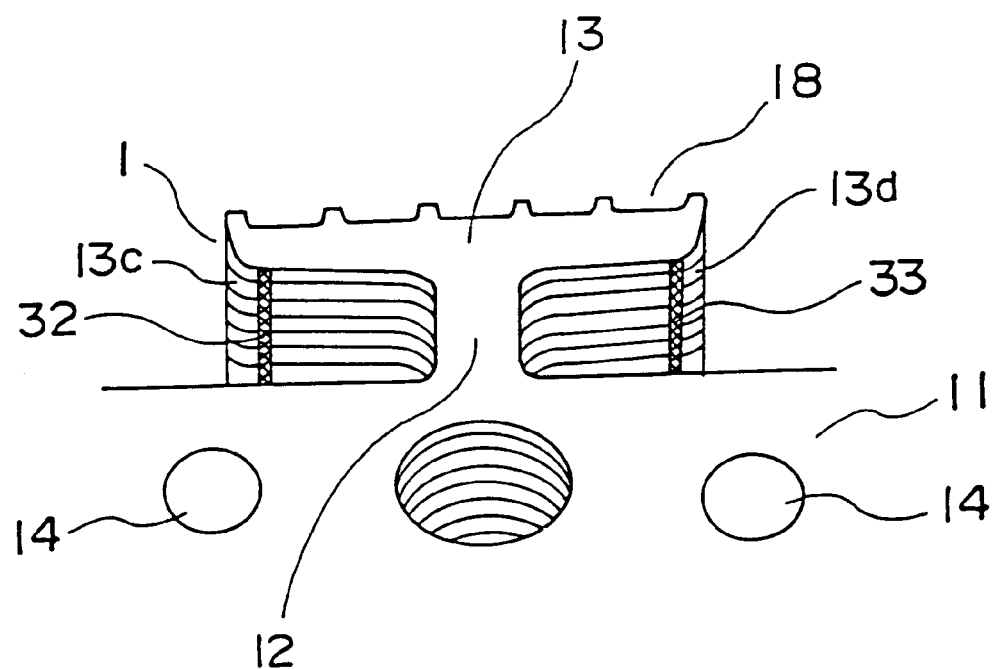
FIG. 9 is a perspective view illustrating a whole structure of a laminated motor core according to Embodiment 2 of the present invention.

Next, description will be made about a laminated core according to Embodiment 2 of the present invention. In this laminated core 1, welded portions 32 and 33 are formed in two back-surface-side shoulder portions 13c and 13d of each of eight magnetic pole portions 13 facing an inner hole 16 of the stator core, as shown in FIG. 9. These welded portions 32 and 33 are extended in the direction of lamination of the laminated core 1 so as to be formed integrally. The welded portions 32 and 33 are formed by welding the surface of the back-surface-side shoulder portions 13c and 13d on the back-surface-side of each of the magnetic pole portions 13, as will be described later. The core pieces 10 are firmly fixed to each other in the surface of each of the magnetic pole portions 13 by the shoulder portions 13c and 13d. This welding of the welded portions 32 and 33 per se is the same as that in Embodiment 1. However, it is performed as follows if laser light is used.

Figure 7:
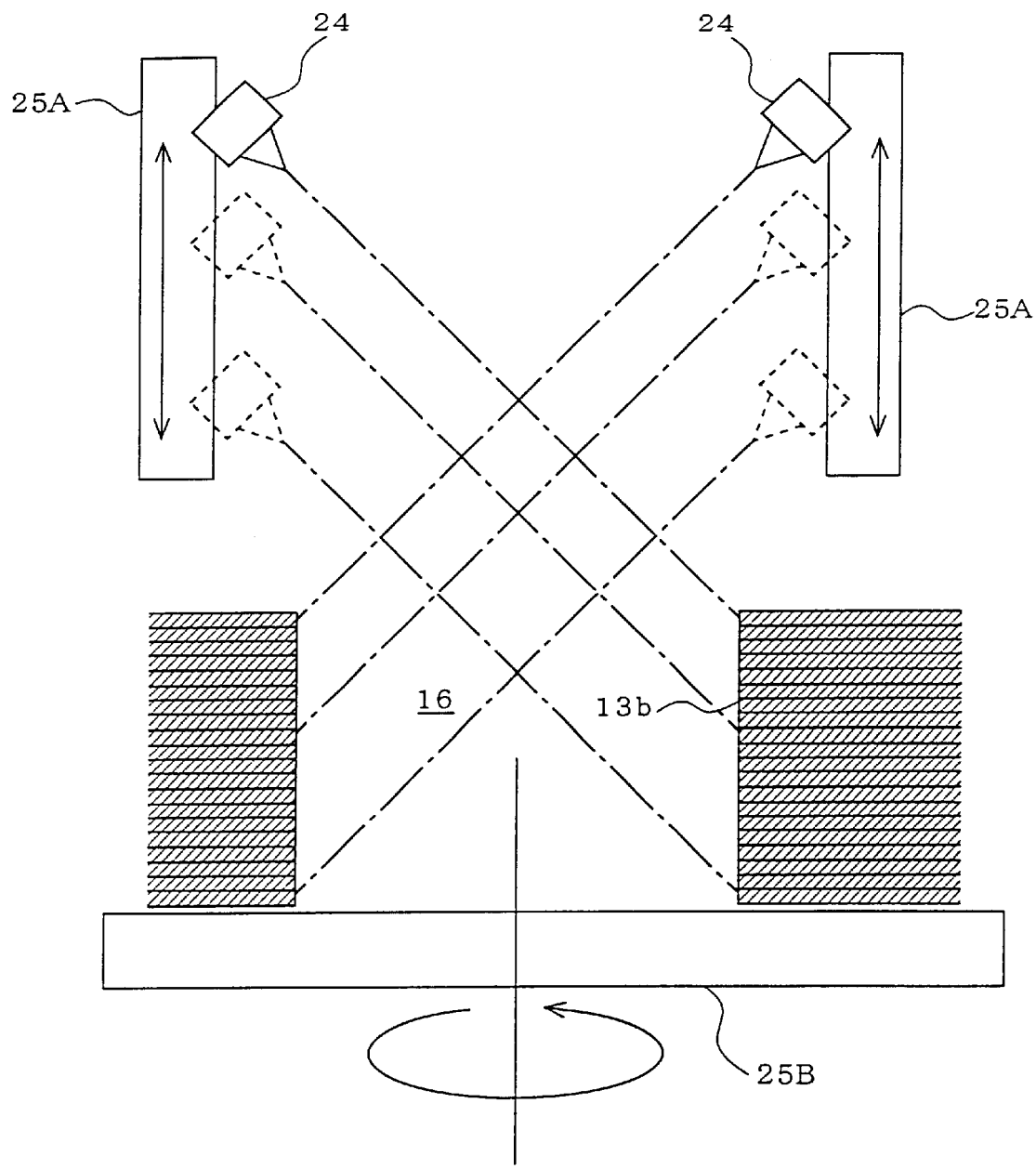
FIG. 7 is a schematic configuration diagram illustrating a structure near a light-irradiated portion in FIG. 6.
Figure 10:
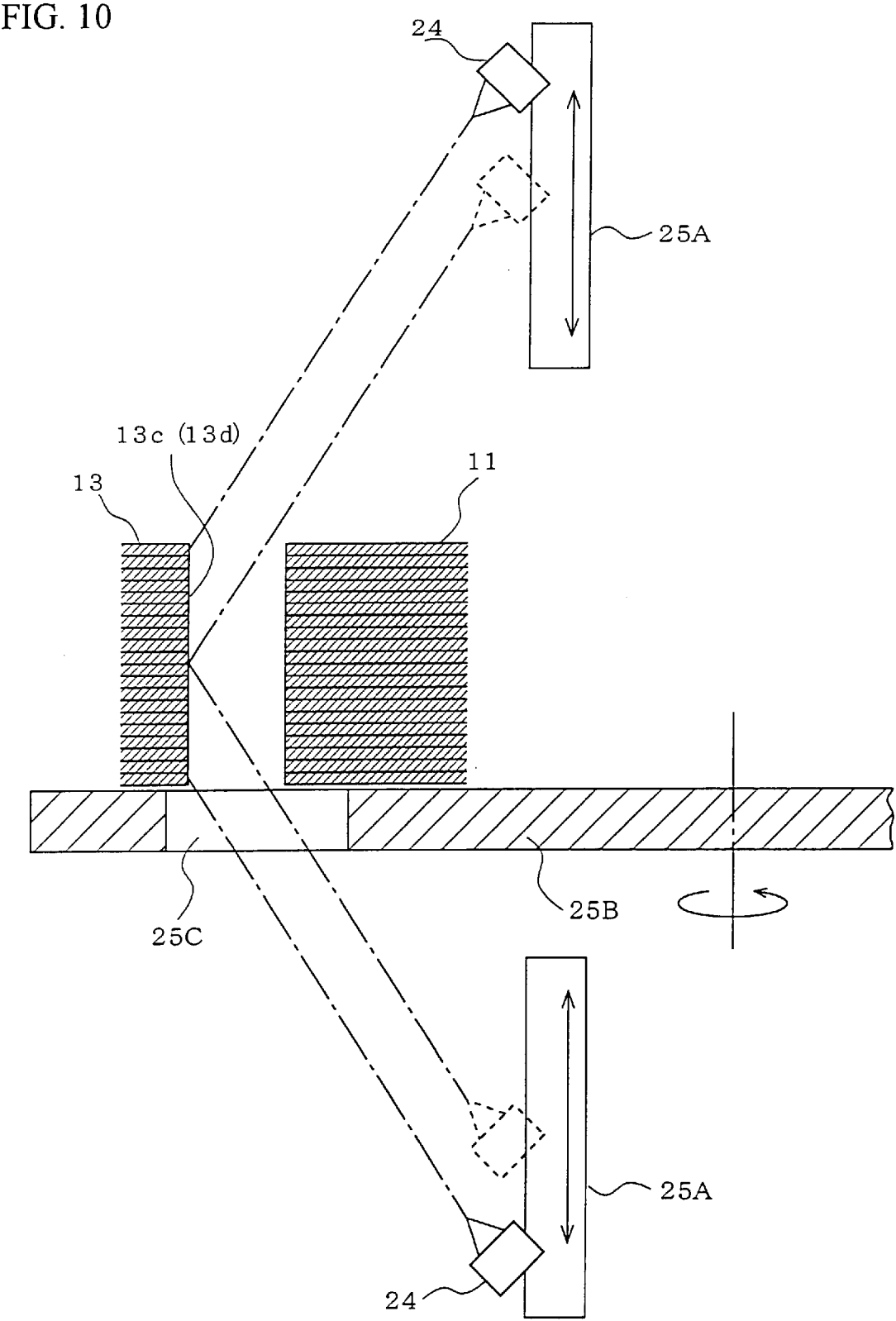
FIG. 10 is a schematic configuration diagram illustrating a structure in the vicinity of a light-radiated portion of an apparatus for performing a welding process for manufacturing the laminated motor core in FIG. 9.

In the case where laser light is radiated on these welded portions 32 and 33, the radiation angle becomes large because the distance between the back-surface-side shoulder portion 13c or 13d of each of the magnetic pole portions 18 and an outer frame portion 11 is short, so that there is a fear that the laser light cannot reach the bottom portion (on the table side) of the laminated core 1 when the laser light is radiated merely from a position above the laminated core 1 as shown in FIG. 7. Therefore, in Embodiment 2, elevation mechanisms 25A for elevating emission units 24 are disposed above and below the laminated core 1 respectively, as shown in FIG. 10. The elevation mechanisms 25A are disposed above and below the laminated core 1 so as to move the emission units 24 up and down while keeping their posture, so that light spots can be moved up and down in the direction of lamination of the core at the back-surface-side shoulder portions of the magnetic pole portion 13. This process is repeated on the two back-surface-side shoulder portions 13c and 13d respectively, and when the process is completed on one magnetic pole portion 13, a rotary table 25B is rotated by an angle of 45 degrees. The process is repeated on the rest unprocessed magnetic pole portions 13 one by one until all the eight magnetic pole portions 13 have been processed. Further, the emission unit 24 disposed below the laminated core 1 in Embodiment 2 radiates laser light on the back-surface-side shoulder portions 13c and 13d through a hole 25C provided in the rotary table 25B.

Also in Embodiment 2, since the magnetic flux density of the two back-surface-side shoulder portions 13c and 13d of each of the magnetic pole portions 13 is small (see FIGS. 4 and 5), the core pieces 10 can be firmly fixed to each other sufficiently in each of the magnetic pole portions 13 under the condition that the welded portions 32 and 33 do not give any influence on the magnetic characteristic of the laminated core 1 as possible.

By the provision of the welded portions symmetrically on the surfaces of the two back-surface-side shoulder portions 13c and 13d of each of the magnetic pole portions 13, it is possible to ensure the symmetry of the fixation force between the core pieces 10, and it is possible to obtain an effect to restrain vibrations efficiently and effectively because portions which may receive magnetic stress most easily are firmly fixed.

A motor in which the laminated core 1 according to Embodiment 2 was incorporated as a stator core and a conventional motor in which a conventional laminated core was incorporated as a stator core were manufactured respectively, and the noise characteristics of those motors were measured and compared in an anechoic room. As a result, the average noise level was 27 dB in the motor of Embodiment 2 while the average noise level was 34 dB in the conventional motor. Thus, it has been confirmed that the motor of Embodiment 2 has an effect to improve noise by 7 dB (noise is reduced by 45%).

Embodiment 3

Figure 11:
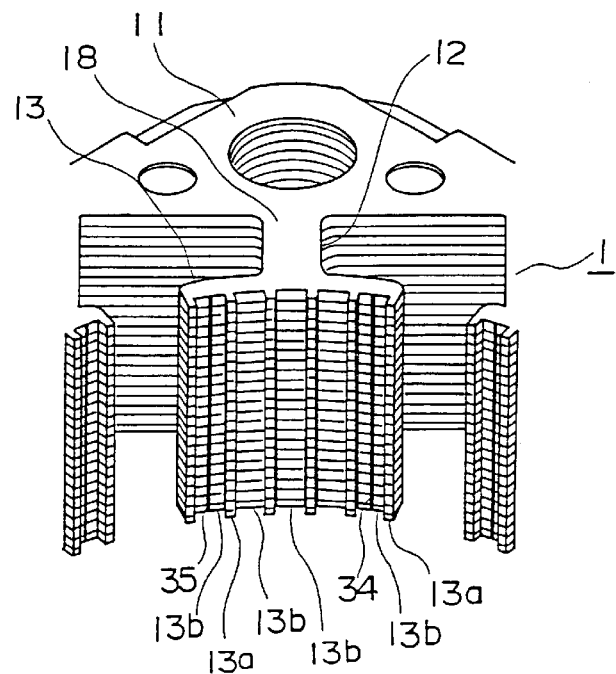
FIG. 11 is a perspective view illustrating a structure of a laminated motor core according to Embodiment 3 of the present invention.

Next, description will be made about a laminated core according to Embodiment 3 of the present invention. In this laminated core 1, of a plurality of mountain portions 13a and groove portions 13b formed on the surface of each of eight magnetic pole portions 13 facing an inner hole 16, welded portions 34 and 35 are formed respectively in the surface of groove portions 13b on the opposite end sides of the magnetic pole portion 13 in the direction of rotation of a not-shown rotor received in the inner hole 16, as shown in FIG. 11.

The welded portions 34 and 35 formed in the groove portions 13b are formed integrally so as to extend in the direction of lamination of the laminated core 1. The welded portions 34 and 35 are formed by welding the surfaces of the groove portions 13b. By these welded portions 34 and 35, core pieces 10 are firmly fixed to each other in the surface portion of each of the magnetic pole portions 13. The welding method or the like of these welded portions 34 and 35 is the same as that in Embodiment 1.

Embodiment 4

Figure 12:
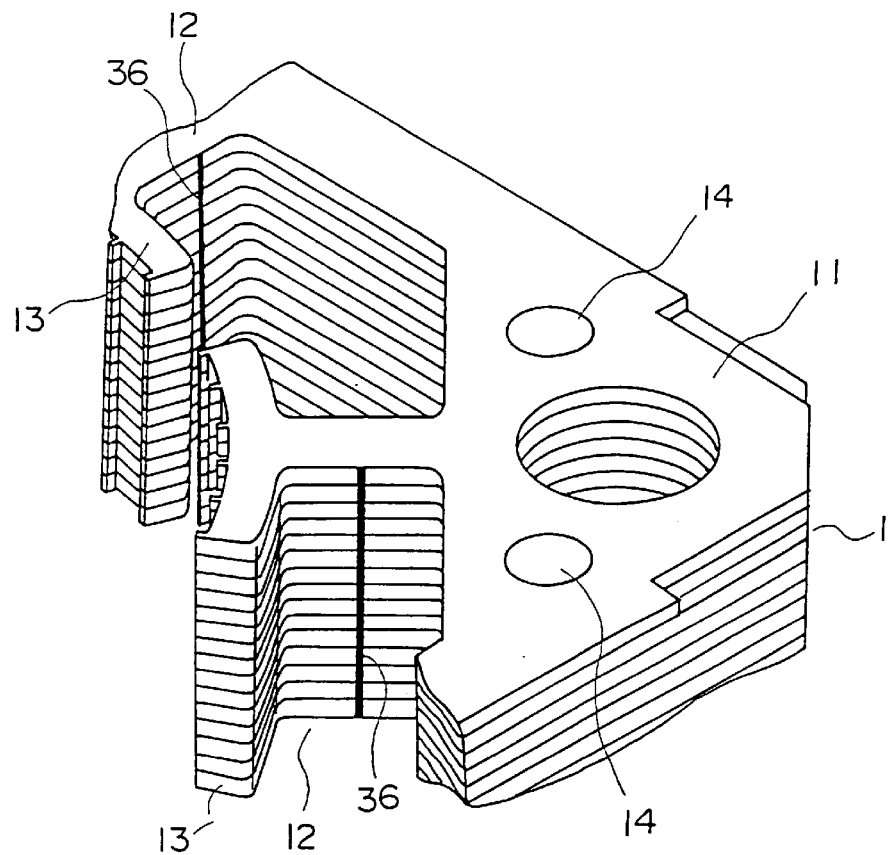
FIG. 12 is a perspective view illustrating a structure of a laminated motor core according to Embodiment 4 of the present invention.

Next, description will be made about a laminated core according to Embodiment 4 of the present invention. In this laminated core 1, welded portions 36 are formed respectively on opposite sides of each of bridges 12, as shown in FIG. 12. In FIG. 12, only one of the welded portions 36 on one side of the bridge 12 is illustrated. The welded portions 36 formed in the bridge 12 are formed integrally so as to extend in the direction of lamination of the laminated core. The welded portions 36 are formed by welding the surface of the bridge 12. By these welded portions 36, core pieces 10 are firmly fixed to each other in the surface portions of the respective bridges 12. The welding method or the like of these welded portions 36 is the same as that in Embodiment 1.

Embodiment 5

Figure 13:
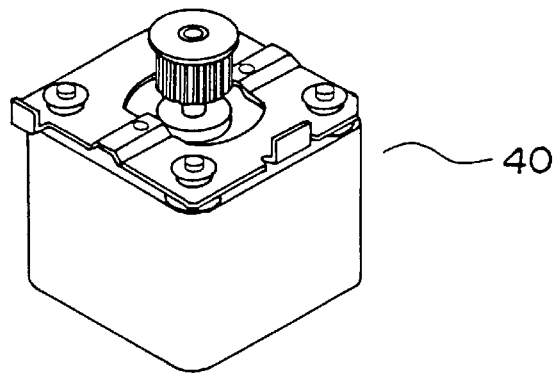
FIG. 13 is a perspective view of a motor including a laminated motor core according to any one of Embodiments 1 to 4.
Figure 14:
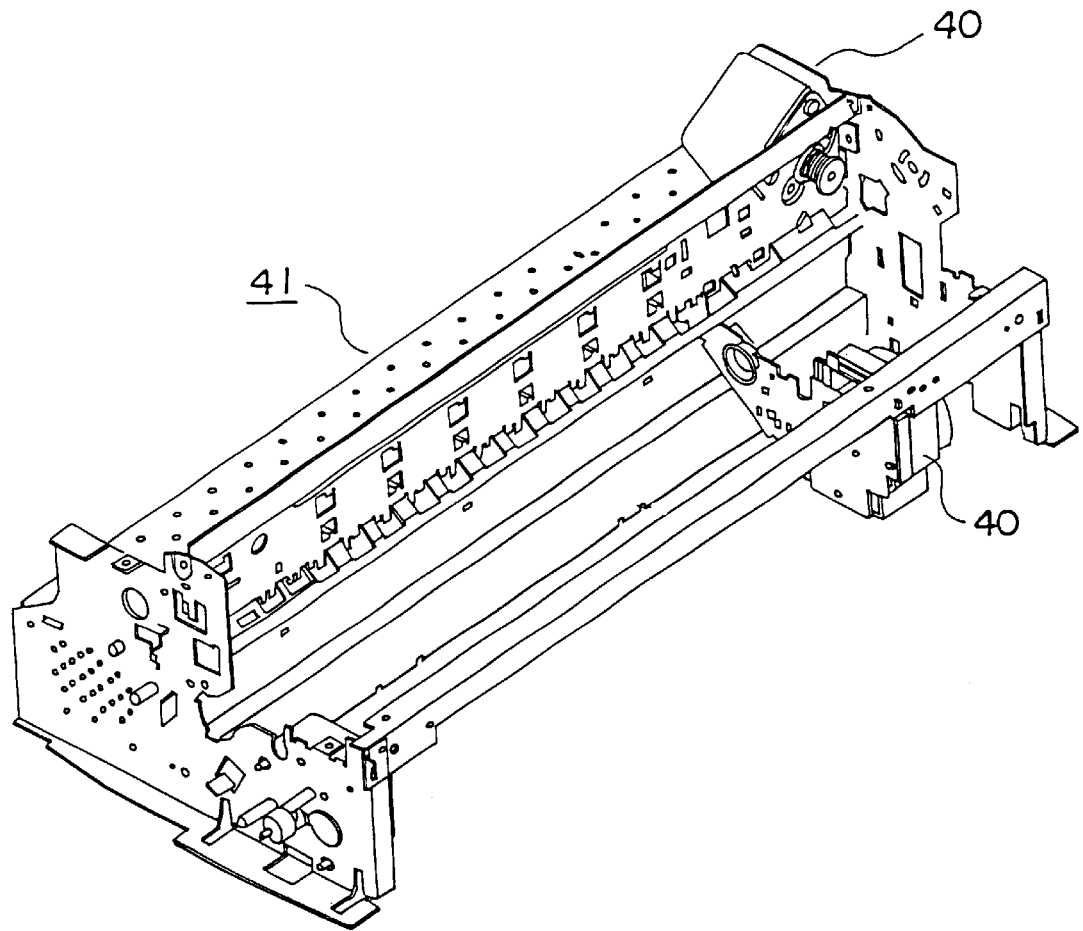
FIG. 14 is a perspective view illustrating an internal structure of an inkjet recording apparatus in which the motor of FIG. 13 is mounted.

Laminated cores according to any one of Embodiments 1 to 4 are incorporated as stator cores in motors 40 shown in FIG. 13, and these motors 40 are mounted, as a driving source for a paper feeding mechanism and a driving source for an ink-jet head feeding mechanism, on an ink-jet recording apparatus 41 shown in FIG. 14. As a result, noise generated when the ink-jet recording apparatus 41 is printing is reduced conspicuously in comparison with the conventional one. Of the two motors 40 in FIG. 14, the upper one is a motor 40 for the paper feeding mechanism, and the lower one is a motor 40 for the ink-jet head feeding mechanism. FIG. 14 shows a state before the paper feeding mechanism and the ink-jet head feeding mechanism have not been assembled. These mechanisms are well known, and therefore the details about these mechanisms are omitted.

What is claimed is:

1. A laminated core of a motor comprising a plurality of magnetic plates laminated one on another, said laminated core being provided with magnetic poles each having a roughed surface constituted by a plurality of mountain portions and successive groove portions formed alternately in the direction of rotation of the motor, and welded portions firmly fixing said magnetic plates to each other, said welded portions being provided on surfaces of said successive groove portions formed in said magnetic poles, on opposite end sides of each of said magnetic poles in said direction of rotation.

2. A laminated core of a motor according to claim 1, wherein each of said welded portions is extended in the direction of lamination of said magnetic plates and formed integrally therewith.

3. A laminated core of a motor according to claim 2, wherein each of said welded portions is formed by a plurality of welded spots disposed to overlap each other in said direction of lamination.

4. A laminated core of a motor according to claim 1, wherein said welded portions are formed by welding by laser radiation.

5. A motor having a laminated core according to claim 1, is included as a stator core.

6. An ink-jet recording apparatus having the motor according to claim 5 mounted as a driving source of a paper feeding mechanism or an ink-jet head feeding mechanism.

7. An ink-jet recording apparatus having the motor according to claim 5, mounted as a driving source of a paper feeding mechanism or an ink-jet head feeding mechanism.

8. A laminated core of a motor in which a plurality of magnetic plates are laminated one on another, said laminated core being provided with magnetic poles each having a roughed surface constituted by mountain portions and groove portions formed alternately in the direction of rotation of the motor, characterized in that welded portions for firmly fixing said magnetic plates to each other are provided on both back-surface-side shoulder portions of each of said magnetic poles.

9. A laminated core of a motor according to claim 8, wherein each of said welded portions is extended in the direction of lamination of said magnetic plates and formed integrally therewith.

10. A laminated core of a motor according to claim 9, wherein each of said welded portions is formed by a plurality of welded spots disposed to overlap each other in said direction of lamination.

11. A laminated core of a motor according to claim 8, wherein said welded portions are formed by welding by laser radiation.

12. A motor having a laminated core according to claim 8, is included as a stator core.

13. A laminated core of a motor in which a plurality of magnetic plates are laminated one on another, said laminated core being provided with magnetic poles each having a roughed surface constituted by mountain portions and groove portions formed alternately in the direction of rotation of the motor, characterized in that welded portions for firmly fixing said magnetic plates to each other are provided on both side surfaces of each of bridge portions connecting said magnetic poles with an outer frame.

14. A laminated core of a motor according to claim 13, wherein each of said welded portions is extended in the direction of lamination of said magnetic plates and formed integrally therewith.

15. A laminated core of a motor according to claim 14, wherein each of said welded portions is formed by a plurality of welded spots disposed to overlap each other in said direction of lamination.

16. A laminated core of a motor according to claim 13, wherein said welded portions are formed by welding by laser radiation.

17. A motor having a laminated core according to claim 13, is included as a stator core.

18. An ink-jet recording apparatus having the motor according to claim 17, mounted as a driving source of a paper feeding mechanism or an ink-jet head feeding mechanism.

* * * * *